US009360015B2

(12) United States Patent
Muizelaar et al.

(10) Patent No.: US 9,360,015 B2
(45) Date of Patent: Jun. 7, 2016

(54) SUBMERGED ROTOR ELECTRIC WATER PUMP WITH STRUCTURAL WETSLEEVE

(71) Applicant: Magna Powertrain of America, Inc., Troy, MI (US)

(72) Inventors: Richard Muizelaar, Mississauga (CA); Nicholas J. Glowacki, Belmont (CA); Liping Wang, Concord (CA); Dave A. Moritz, Port Stanley (CA); Kyle Mills, Concord (CA); Andrew Lakerdas, London (CA)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 413 days.

(21) Appl. No.: 13/838,098

(22) Filed: Mar. 15, 2013

(65) Prior Publication Data
US 2014/0017073 A1    Jan. 16, 2014

Related U.S. Application Data

(60) Provisional application No. 61/672,044, filed on Jul. 16, 2012.

(51) Int. Cl.
*F04D 13/06* (2006.01)
*F04D 29/58* (2006.01)
(Continued)

(52) U.S. Cl.
CPC ........ *F04D 13/0626* (2013.01); *F04D 13/0606* (2013.01); *F04D 13/0686* (2013.01);
(Continued)

(58) Field of Classification Search
CPC . F04D 13/06; F04D 13/0606; F04D 13/0686; F04D 13/0086; F04D 29/586; F04D 29/588; F04D 29/426; F04D 13/0693; F04D 13/0653; H02K 5/15; H02K 5/225; H02K 5/04; H02K 5/10; H02K 5/02; H02K 2005/1287

USPC ............. 417/423.7, 423.1, 423.14, 357, 366, 417/371
See application file for complete search history.

(56) References Cited

U.S. PATENT DOCUMENTS 4,971,525 A   11/1990  Nakayoshi et al.
5,500,994 A    3/1996  Itaya
(Continued)

FOREIGN PATENT DOCUMENTS

DE    199 43 577     3/2001
EP     0 328 075     8/1989
(Continued)

OTHER PUBLICATIONS

Company: Turner motorsport Title: Water Pump and Thermostat Package Date Published (mm/dd/yyyy): Jul. 5, 2012 Date Accessed (mm/dd/yyyy): Mar. 4, 2015 Website Link: https://web.archive.org/web/20120705044313/http:/www.turnermotorsport.com/p-16432-water-pump-and-thermostat-package-n54-engine-e82-135i-e9x-335i-e60-535i.aspx.*

(Continued)

*Primary Examiner* — Bryan Lettman
*Assistant Examiner* — Chirag Jariwala
(74) *Attorney, Agent, or Firm* — Warn Partners, P.C.

(57) ABSTRACT

An electric water pump, and more specifically an electric water pump having an improved wet sleeve so that the water pump is free of a housing. The electric water includes a pump rotor having a shaft. A wetsleeve surrounds the rotor and has a cap, a sleeve that houses the rotor, and a seat in communication with the shaft of the rotor so that the seat assists in supporting the shaft a stator. Surrounding the wet sleeve and the rotor is a volute covering an upper portion of the rotor, wet sleeve, and stator. The electric water pump further includes a rubber boot covering a lower portion of the rotor, wet sleeve, and stator and is in communication with the volute forming a cover.

15 Claims, 8 Drawing Sheets

(51) Int. Cl.
    *F04D 29/02*  (2006.01)
    *F04D 29/42*  (2006.01)
    *H02K 5/128*  (2006.01)
(52) U.S. Cl.
    CPC ............ *F04D29/026* (2013.01); *F04D 29/426* (2013.01); *F04D 29/588* (2013.01); *H02K 2005/1287* (2013.01)

(56) References Cited

U.S. PATENT DOCUMENTS

| | | | |
|---|---|---|---|
| 5,997,261 A * | 12/1999 | Kershaw et al. | F04D 29/588 310/54 |
| 6,247,429 B1 | 6/2001 | Hara et al. | |
| 6,524,083 B2 | 2/2003 | Deai et al. | |
| 6,857,332 B2 | 2/2005 | Pfister | |
| 6,896,494 B2 * | 5/2005 | Sunaga et al. | 417/423.1 |
| 6,939,115 B2 | 9/2005 | Knoll et al. | |
| 7,036,892 B2 | 5/2006 | Suzuki et al. | |
| 7,750,529 B2 * | 7/2010 | Tajima et al. | 310/257 |
| 2005/0103286 A1 | 5/2005 | Ji | |
| 2005/0196306 A1 | 9/2005 | Del Zanno | |
| 2007/0018521 A1 | 1/2007 | Ishiguro et al. | |
| 2007/0286723 A1 * | 12/2007 | Ihle | F04D 29/5893 415/206 |
| 2009/0252607 A1 * | 10/2009 | Hein et al. | F04D 29/043 415/229 |
| 2012/0014819 A1 * | 1/2012 | Ishiguro | 417/410.1 |

FOREIGN PATENT DOCUMENTS

| | | | |
|---|---|---|---|
| EP | 0328075 | * | 8/1989 |
| EP | 0 976 817 | | 2/2000 |
| EP | 1 482 175 | | 12/2004 |
| EP | 1 503 085 | | 11/2005 |
| EP | 2 072 828 | | 6/2009 |
| EP | 2072828 | * | 6/2009 |
| EP | 2 233 744 | | 9/2010 |
| FR | 2 635 831 | | 3/1990 |
| GB | 2 272 944 | | 6/1994 |
| KR | 100 868 615 | | 11/2008 |
| WO | 2008/072438 | | 6/2008 |

OTHER PUBLICATIONS

Company: Turner motorsport Title: Water Pump and Thermostat Package Date Published (mm/dd/yyyy): Jul. 5, 2012 Date Accessed (mm/dd/yyyy): Mar. 4, 2015 Website Link: https://web.archive.org/web/20120705044313/http://www.turnermotorsport.com/p-16432-water-pump-and-thermostat-package-n54-engine-e82-135i-e9x-335i-e60-535i.aspx.*
International Searching Authority; Search report for PCT/US2013/050733; Oct. 28, 2013.
International Searching Authority; Search Report for PCT/US2013/050659; Oct. 23, 2013.

* cited by examiner

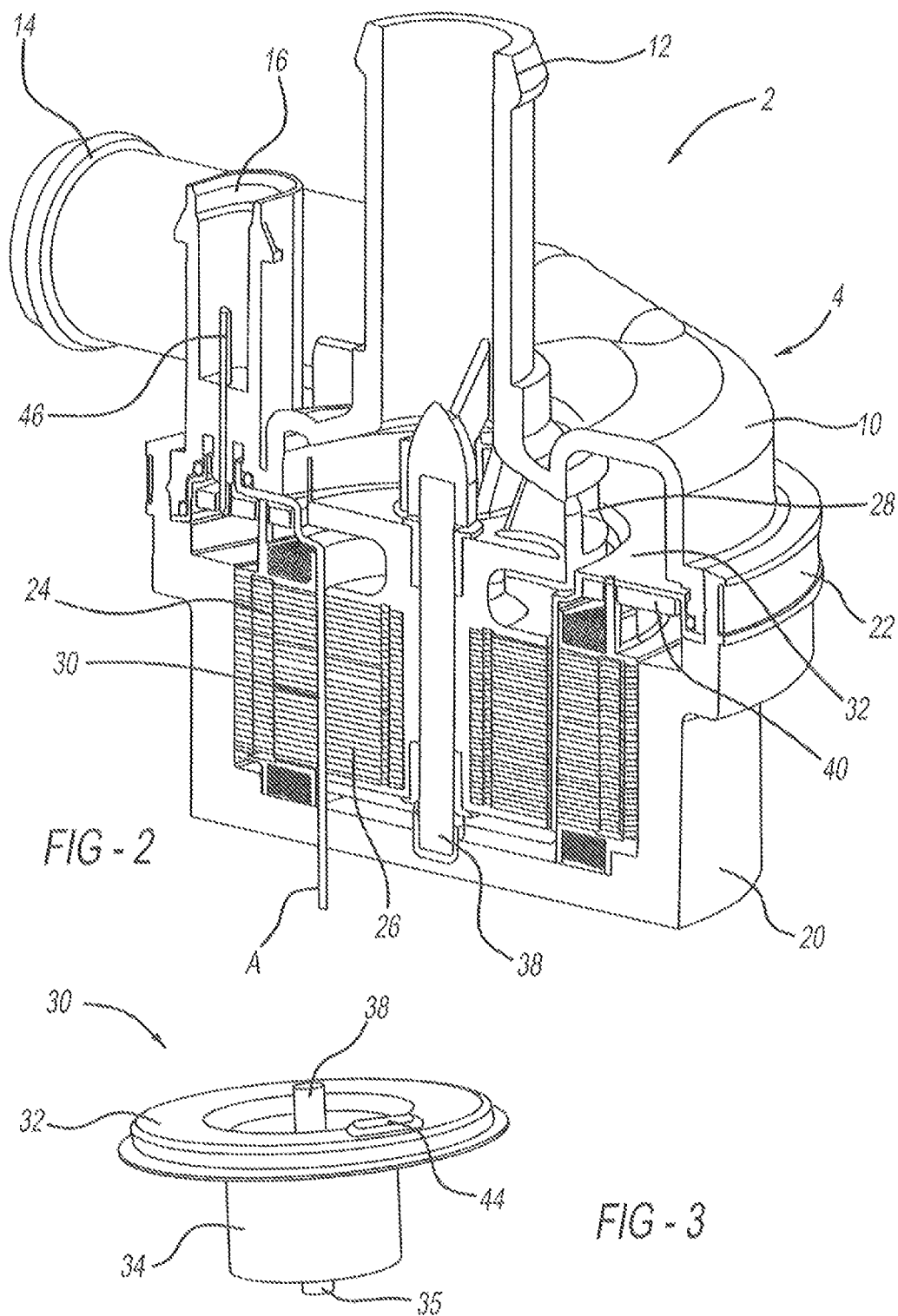

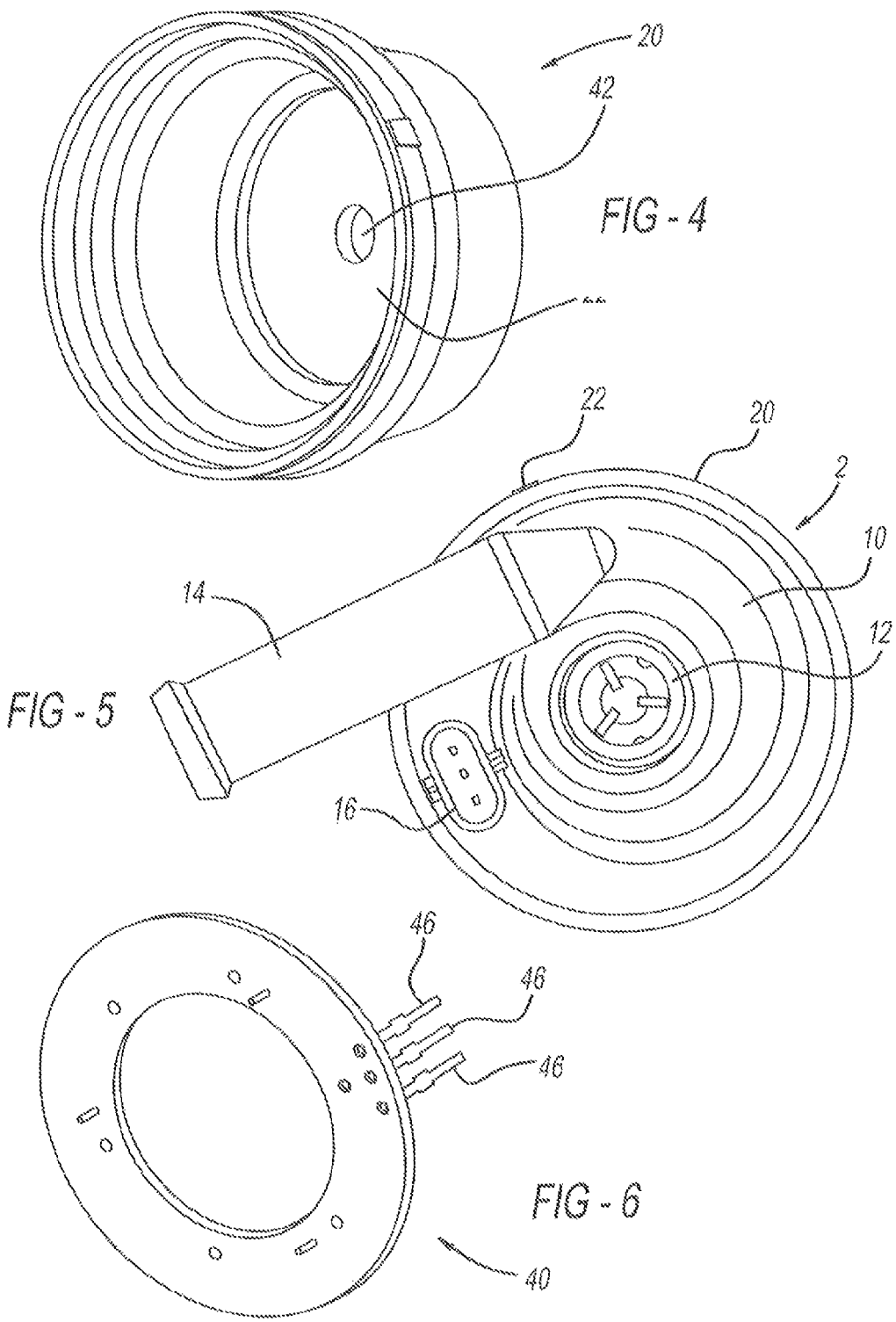

SUBMERGED ROTOR ELECTRIC WATER PUMP WITH STRUCTURAL WETSLEEVE

CROSS-REFERENCE TO RELATED APPLICATIONS

This application claims the benefit of U.S. Provisional Application No. 61/672,044 filed Jul. 16, 2012.

FIELD OF THE INVENTION

The present invention relates to an improved electric water pump, and more specifically an electric water pump having an improved wet sleeve so that the water pump is free of a housing.

DISCUSSION OF RELATED ART

Generally, water pumps include a stator and rotor. The rotor is in communication with an impeller for moving a fluid. The fluid enters the pump through an inlet in a volute, contacted with an impeller and moved through an outlet in the volute. The rotor and stator are contained with a housing that connects with the volute. Generally, the rotor and stator are separated by a magnetic air gap and the rotor and stator include rare earth metals so that magnetic air gap between the rotor and stator may be bridged so that the rotor is rotated during use and so that the rotor, the stator, or both may be isolated from the fluids during use and continue to operate. However, the use of rare earth metals may be damaged by the fluid such that the rare earth metals may require additional packaging so that damage is prevented. Examples of some pumps may be found in U.S. Pat. Nos. 4,971,525; 5,500,994; 6,247,429; 6,524,083; 6,939,115; and 7,036,892; U.S. Patent Application Publication No. 2007/0018521; and European Patent Application Nos. EP 097 6817 A2; EP 1 482 175 A2, and EP 1 503 085 A2 all of which are incorporated by reference herein for all purposes.

It would be attractive to have a pump that includes a low magnetic air gap between the rotor and the stator. It would be attractive to have a pump with a reduced volume and mass so that the pump may fit within a smaller space of a machine such as a vehicle engine. It would be attractive to have a pump that includes fewer components while maintaining motor efficiency, pumping efficiency, and noise, vibration, and harshness characteristics. The present invention also provides an arrangement for dissipating heat derived from the stator windings and electronics to coolant or fluid by way of a thermal medium (such as thermal grease or isotropic film) to a wetsleeve, which allows for a smaller packaging of the arrangement.

In one exemplary embodiment, there is disclosed, a electric pump comprising: a rotor a wet sleeve surrounding the rotor; and a stator surrounding the wet sleeve and the rotor; wherein the rotor and stator have a magnetic air gap minimum magnetic air gap.

In one exemplary embodiment, there is disclosed, an electric pump comprising: a rotor having a shaft; a wetsleeve surrounding the rotor, wherein the wetsleeve comprises: a cap, a sleeve that houses the rotor, and a seat in communication with the shaft of the rotor so that the seat assists in supporting the shaft of the rotor surrounding the wet sleeve and the rotor; a volute covering an upper portion of the rotor, wet sleeve, and stator; and a rubber boot covering a lower portion of the rotor, wet sleeve, and stator, wherein the rubber boot is in communication with the volute forming a cover; wherein the rotor and stator have a magnetic air gap.

The present teachings solve one or more problems discussed herein by providing a pump that includes a low magnetic gap between the rotor and the stator. The present teachings provide a pump with a reduced volume and mass so that the pump may fit within a smaller space of a machine such as a vehicle engine. The present teachings include a pump that includes fewer components while maintaining motor efficiency, pumping efficiency, and noise, vibration, and harshness characteristics. The pump of the present teachings eliminates the need for channeling cooling so that the components may be maintained within a predetermined temperature range.

BRIEF DESCRIPTION OF THE DRAWINGS

FIG. 2 is a cross-sectional view of FIG. 1 along line I-I;

FIG. 3 is one embodiment of a wetsleeve of the teachings herein;

FIG. 4 is one embodiment of an environmental housing of the teachings herein;

FIG. 5 illustrates a top view of a water pump;

FIG. 6 illustrates an electronic donut, one possible configuration, other configurations for electronics are possible;

DETAILED DESCRIPTION

Figure 1:
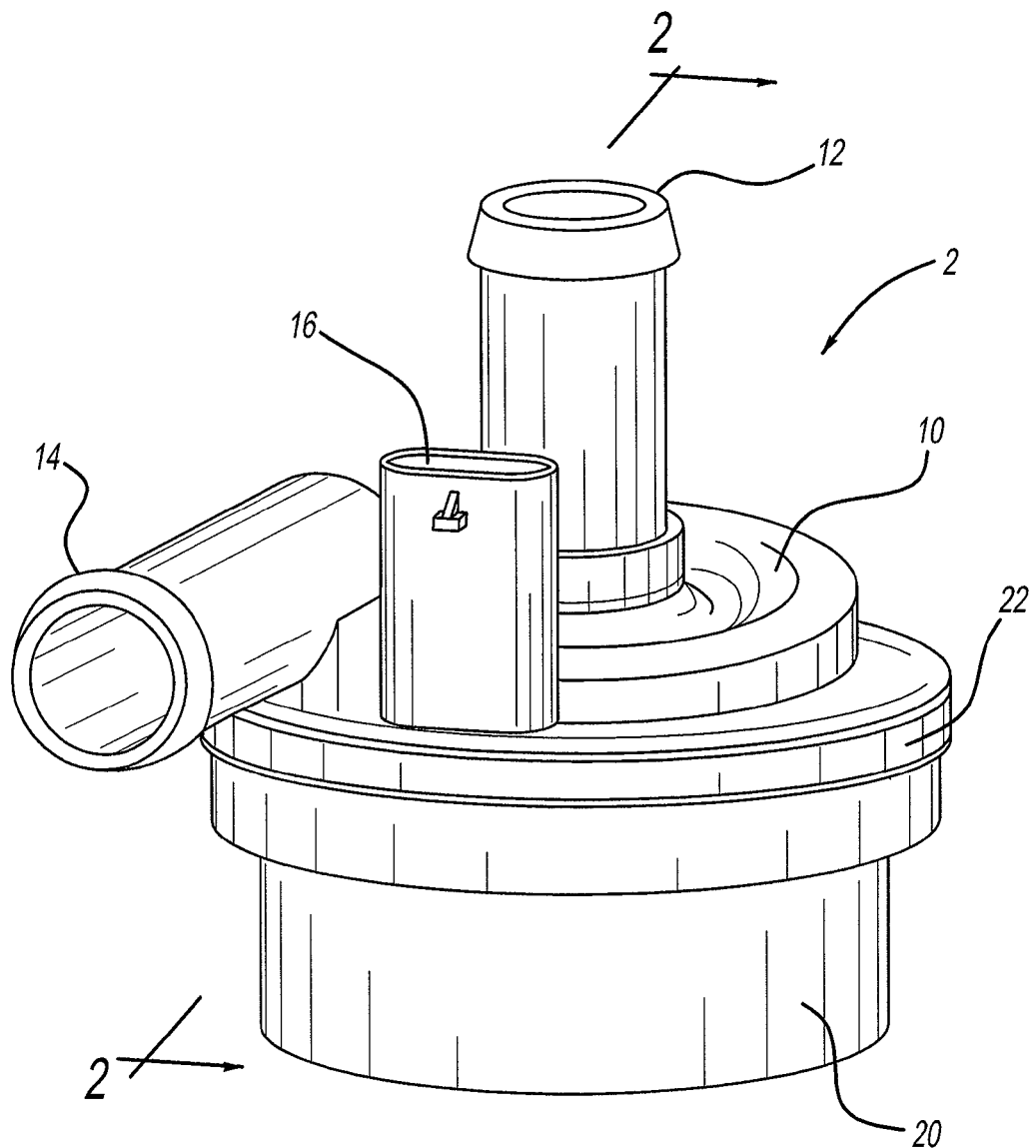
FIG. 1 is a perspective of a water pump with environmental housing.

Referring in general to all of the figures, the present disclosure and teachings described herein provide for a housingless water pump (hereinafter "pump") that is utilized as part of an engine cooling system. The pump may be any pump that moves a fluid. The pump may move air, water, anti-freeze, coolant, or a combination thereof. The pump may operate using any automotive voltage. The pump taught herein may use about 10 watts or more, about 15 watts or more, about 20 watts or more, or about 25 watts or more to operate. The pump may operate using about 50 watts or less, about 45 watts or less, about 40 watts or less, or about 35 watts or less.

The pump includes a rotor and a stator. The rotor and stator are separated by a wetsleeve. The stator may be any stator that assists in rotating a rotor so that a fluid is moved. The stator may be any configuration so that the stator rotates a rotor and assists in moving a fluid. The stator includes one or more coils. The coil may be any coil capable of generating an electric field so that when the pump is turned on the stator may rotate the rotor. Preferably, the coil is made of one or more copper windings. The magnet may be any magnet capable of assisting in generating the electric field. The magnets may be made of any material that is useful in rotating a rotor. The magnets may be made of a rare earth metal, iron, nickel, cobalt, or a combination thereof. Preferably the magnets are made of a ferrous material. More preferably, the magnets are free of rare earth metals. The magnets of the stator may be made of the same material as the magnets of the rotor.

The rotor may be any rotor that is rotated by a stator to move a fluid. The rotor may include a shaft and one or more magnets. The shaft may be any shaft that rotates or is fixed (and hence stationary) and allows the rotor to rotate. The shaft may be any shaft that supports the rotor so that the rotor rotates. The rotor may rotate around the shaft and the shaft may act as the axis of rotation. The one or more magnets may be made of any material as discussed above for the stator. The one or more magnets may be selected such that the residual magnetic flux density is sufficient to bridge a magnetic air gap between the rotor and the stator. The one or more magnets may be selected such that the residual magnetic flux density is sufficient that the rotor and stator are in electrical communication through a wet sleeve, a magnetic air gap, or both. The one or more magnets may each have a residual magnetic flux density (BR) of about 0.1 tesla or more, about 0.2 tesla or more, about 0.3 tesla or more, or about 0.4 tesla or more.

The one or more magnets may be attached to the shaft via a mounting. The mounting may be any device that assists in attaching the one or more magnets to a shaft so that the magnets rotate. The mounting may be one unitary piece that houses the one or more magnets. The mounting may include an impeller.

The impeller may be an integral part of the mounting. The impeller may be separately attached to the shaft. Preferably, the mounting and the impeller are on unitary piece and the shaft and/or one or more magnets are press fit into the mounting so that a rotor is created. The impeller may be any shape and size so that when the impeller rotates a fluid is moved. The impeller may be located at any location along the rotor. Preferably, the impeller is located at the top or the bottom of the rotor. The impeller may include one or more vanes so that as the impeller rotates a fluid is moved. Preferably, the impeller includes a plurality of vanes. The impeller may be located proximate to the wet sleeve.

The wetsleeve may be located at any location within the water pump so that the wetsleeve assists in cooling those components that generate heat. Preferably, the wetsleeve is in direct communication with the coolant and provides a hydraulic boundary or enclosure. The wetsleeve may be located at any location so that the rotor and stator are separated. The wetsleeve may be located at any location so that the stator is separated from any fluids circulated through the housingless water pump. The wetsleeve preferably separates the rotor from the stator so that the rotor may contact fluid and the stator may be free of contact with the fluid. The wetsleeve may be press fit into the stator. The wetsleeve also supports the shaft and stator and provides accurate positioning of the rotor and stator. The wetsleeve may be located below the impeller so that the wetsleeve assists is directing fluid into contact with the impeller so that the fluid is moved through the pump. The wet sleeve may be made of any material that may prevent fluid from passing the wetsleeve. The wet sleeve may be abrasion resistant, chemical resistant, conductive, non-conductive, or a combination thereof. The wetsleeve preferably may be made of a material that may be stamped or formed. The wetsleeve may be made of one unitary piece of formed material. The wet sleeve may be made of any material that may not corrode when subjected to fluids that may be circulated through an automotive vehicle. The wetsleeve may be resistant to water, ethylene glycol, anti-freeze, oil, or a combination thereof. The wetsleeve may be made of any material that conducts heat so that the wet sleeve assists in cooling the pump. The wetsleeve may be of steel, stainless steel, titanium, or a combination thereof. The wetsleeve may be any configuration so that the wetsleeve prevents fluid transfer across the wet sleeve, assists in heat transfer, is free of interference with the magnetics between the rotor and stator (e.g., eddy currents), or a combination thereof. Preferably, the wetsleeve is sufficiently thin that the rotor and stator may be magnetic communication. More preferably, the wetsleeve is sufficiently thin such that one or more non-rare earth metal magnets may be used and the wetsleeve is free of interference with the magnetic communication between the rotor and the stator. The wetsleeve may have any thickness so that the magnetic airgap is small enough so that non-rare earth metal magnets in a rotor and a stator may magnetically communicate so that the pump moves a fluid. The wetsleeve may have a thickness of about 3 mm or less, preferably about 2 mm or less, or more preferably about 1 mm or less. The wet sleeve may have a thickness of about 0.1 mm or more, about 0.2 mm or more, or about 0.3 mm or more. The wetsleeve may include a cap, a sleeve, and a seat.

The cap is the flanged portion of the wetsleeve and may be any part that contacts a boot and seals at least a portion of the pump. Preferably, the cap contacts the boot and separates the stator, the electronic donut, or both from the fluid. The cap may form a connection with the boot, the volute, or both so that a pump may be formed; a fluid may be prevented from passing the cap, or both. The cap may have an opening and a seal which allows the power to pass through the wetsleeve but not the coolant. The power adapter may be any part that allows power to pass through the wetsleeve without fluid passing through the set sleeve. The power adapter may be located at any location along the cap. Preferably, the power adapter is aligned with a power supply connection of the volute and a power line of the electronic donut so that the electronic donut receives power. The cap may be contoured so that the impeller may fit within the cap, so that fluid may be directed to the impeller, so that fluid is moved by the impeller down into the sleeve.

The sleeve is connected to and extends from the cap. The sleeve and the cap may be one integral piece, may be bonded together, may be formed separately and connected, or a combination thereof. The sleeve may be any size and shape so that the sleeve houses the rotor, the stator, or both. Preferably, the sleeve is shaped so that the sleeve separates the rotor and stator. The sleeve may form a portion of a magnetic air gap between the rotor and the stator. The magnetic air gap may be the distance between an edge of a stator and an edge of the rotor. For example, when a rotor is located within a stator the magnetic air gap is the distance from the inner diameter of the stator to the outer diameter of the rotor and any intervening components located there between. Thus, in another example, the magnetic air gap is measured from an outer circumference of the rotor through the wetsleeve and terminates at the inner circumference of the stator. A magnetic air gap as taught herein may be any gap so that the rotor and stator may be in magnetic communication such that the rotor may rotate the impeller and move a fluid. The magnetic air gap may be sufficient so that a magnetic flux generated by the stator may reach the rotor. The sleeve may be shaped so that the sleeve houses the rotor and the rotor may rotate while housed within the sleeve. The sleeve may have a sufficient gap from the rotor so that fluids may move in and out of the sleeve. The sleeve may be free of channels that assist in circulating fluids around the rotor. The sleeve may be substantially smooth so that hydraulic efficiency is not reduced through movement of the fluid throughout the sleeve. The sleeve may extend substantially the length of the rotor. Preferably, the sleeve extends at least the length of the magnets of the rotor. The sleeve may form a cup shape so that the rotor may be fit within the sleeve. The sleeve may include a seat on a bottom portion.

The seat may be any part of the wetsleeve that located along the rotational axis of the rotor. The seat may be any part that assists in holding a shaft of the rotor in place. The seat may form a groove that the shaft extends into. The seat may house another component that is in communication with an end of the shaft so that the shaft is free to rotate during use. The seat may be flat, pointed, round, or a combination thereof. The seat may include a low friction coating that assist in the shaft rotating. The seat may matingly fit the shaft, matingly fit within the boot, or both. The shaft may be pressed into place or fixed into position in the seat.

The boot may be any part of the pump that connects to the volute and forms a cover. The boot may be any size and shape so that the boot covers the internal components of the pump and assists in sealing the pump. The boot may form a mating connection with the volute, the wet sleeve, the stator, the rotor, or a combination thereof. Preferably, the stator is located within the boot and the boot assists in sealing the stator so that the stator is separated from any surrounding fluids. The boot may be made of any material that may be resistant to the fluids moved through the pump. Preferably, the boot is made of a material that substantially reduces and/or eliminates any noise, vibration, and harshness of the pump. The boot may seal the pump so that contaminants may not be introduced into the system through the pump and/or the pump may not introduce fluid into the surrounding system. The boot may act as a housing. The boot may replace a housing. Preferably, the boot is not encompassed by a housing and/or surrounding by any addition materials. The boot may be attached to the volute may any suitable device. The boot and volute may be press fit, heat sealed, glued, screwed, fastened, or a combination thereof together. Preferably, the boot and volute are connected via a band clamp.

The band clamp may be any device that connect the boot to the volute so that a cover is formed. The band clamp may be permanent, removable, reusable, or a combination thereof. Preferably, the band clamp may encircle the boot and/or volute so that the boot and volute are connected via the band clamp. The band clamp may form an environmental seal around the internal components of the pump. The band clamp may be free of plastic, welding, glue, screws, or a combination thereof to form a connection. The band clamp may be configured so that the band clamp indicates tampering, a non-service condition, or both. The band clamp may compress the boot on the volute so that a leak proof seal is formed.

The volute may be any device that when connected with the boot forms a cover on the pump. The volute may include an inlet and an outlet. The pump may include an inlet that guides fluid into the pump so that the fluid contacts the impeller and is moved out of the pump via the outlet. The volute may assist in circulating fluid around the impeller and into the wetsleeve so that rotor is in contact with the fluid. The inlet may be arranged at any angle so that fluid brought into the pump may be moved out of the pump at a greater pressure than the fluid entered the pump. Preferably, the inlet is substantially aligned along the rotational axis of the rotor. The outlet may be any configuration so that fluid contacted with the impeller is moved out of the pump into the system. The outlet may be located radially form the impeller. The outlet may gradually become larger as the outlet extends from the impeller. The outlet may be located at any location so that pressurized fluid is transferred from the impeller through the outlet and into the system. The outlet be substantially at a right angle with the inlet. The volute may include one or more power supply connections. The power supply connection may be at any location so that power, signals, or both are introduced into the pump so that the pump operates. The power supply connection may supply power to the stator, the electronic donut, or a combination thereof. The power supply connection may include a connection so that a portion of the electronic donut extends through the wetsleeve and into the power supply connection so that the electronic donut is powered. The power supply connection may be any shape and configuration so that a mating relationship may be formed between one or more power lines of a vehicle and the power supply connection so that power, signals, or both may be provided to the pump. The power supply connection may be configured so that one or more power connectors may extend from one or more internal components through the power supply connection and into contact with one or more power and/or signal supply lines so that the pump may be powered and/or operated. The power supply connection may form a removably fixed connection with one or more power supply lines so that the power supply lines power the electronic donut.

The electronic donut may be any size, shape or configuration so that all or a portion of the electronic donut may extend from the inside of the pump through the power supply connection and into communication with a supply line. The electronic donut may be any device that assists in controlling the pump, assist in supplying power to the components of the pump, or a combination thereof. The electronic donut may include any sensors, controllers, instrumentation, or a combination thereof to run the pump so that the pump supplies a sufficient amount of fluid so that the connected system is cooled, heated, lubricated, or a combination thereof. The electronic donut may be a printed circuit board with one or more processors, microprocessors, Hall effects sensors, an AC signal generator, one or more supply lines for supplying a signal, power, or both, or a combination thereof. The electronic donut may be located at any location so that the electronic donut assists in controlling the pump. The electronic donut may be in connection with the wet sleeve, the power supply connection, or both so that the electronic donut is free of any loads applied to the electronic donut (i.e., and pulling on the wires and/or supply lines are directly transferred to the wet sleeve and/or the power supply connection so that the printed circuit board, the supply lines, or both are not damaged). Preferably, the electronic donut is located so that the electronic donut remains dry. More preferably, the electronic donut is located in communication so that the electronic donut is cooled by heat transfer through the wet sleeve into the fluid while the electronic donut remains dry. The electronic donut may be press fit into the wet sleeve. Preferably, the electronic donut includes a thermal paste, thermal glue, thermal adhesive, or a combination thereof to connect the electronic donut to the wet sleeve so that thermal conduction occurs through the wetsleeve.

FIG. 1 illustrates a water pump 2. The water pump 2 includes a volute 10, a boot 20, and a band clamp 22 attaching the boot 20 and the volute 10. The volute 10 includes an inlet 12 and an outlet 14. The volute includes a power supply connection 16.

FIG. 2 illustrates a cross sectional view of the housingless water pump 2 along line I-I of FIG. 1. The volute 10 is connected to a boot 20 via a band clamp 22 forming a cover 4, which encompasses the internal components and includes a power supply connection 16 for housing a supply line 46. The internal components of the housingless water pump 2 include a stator 24 press fit into the boot 20. The stator 24 surrounds a rotor 26. The rotor 26 is separated from the stator 24 by a wet sleeve 30. The rotor 26 and the stator 24 are separated by a magnetic air gap having a distance (A). The wet sleeve 30 prevents fluid from contacting the stator 24. The rotor 26 includes a shaft 38 and an impeller 28 for moving a fluid as the fluid enters the inlet 12. The impeller 28 moves the fluid through the outlet 14 for use. An electronic donut 40 is located outside the wet sleeve 30 so that the electronic donut 40 is separated from any fluids within the housingless pump 2.

FIG. 3 illustrates one example of a wet sleeve 30. The wet sleeve 30 has a cap 32 that covers the stator 24 and a sleeve 34 that fits within the stator 24 and houses the rotor 26. The cap 32 has a power adapter 44 so that power can pass through wet sleeve into communication with the stator. The sleeve 34 includes a seat 35 for holding a shaft 38 of the rotor 26.

FIG. 4 illustrates one possible embodiment of the boot 20 and band clamp 22. The boot 20 includes an internal volume 42 for containing the internal components (not shown) of the housingless pump.

FIG. 5 illustrates a top view of a housingless pump 2. The volute 10 includes an inlet 12, an outlet 14, and a power supply connection 16. The volute 10 is attached to a boot 20 via a band clamp 22.

FIG. 6 illustrates one example of an electronic donut 40 having three supply lines 46.

Figure 7:
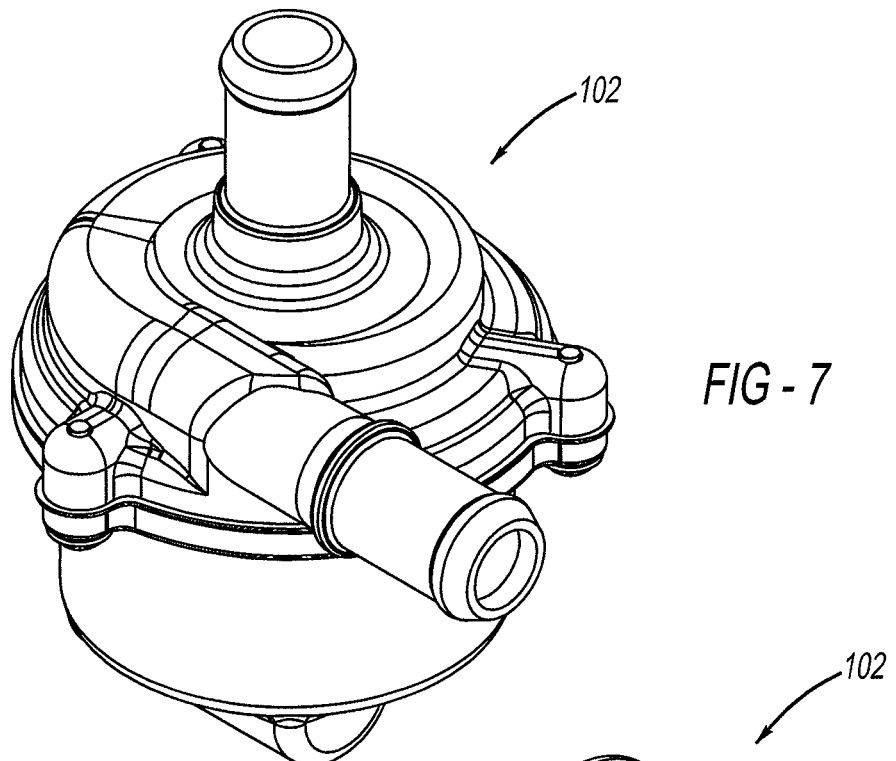
FIG. 7 is a perspective top view of an alternate embodiment of water pump arrangement in accordance with the present invention.
Figure 8:
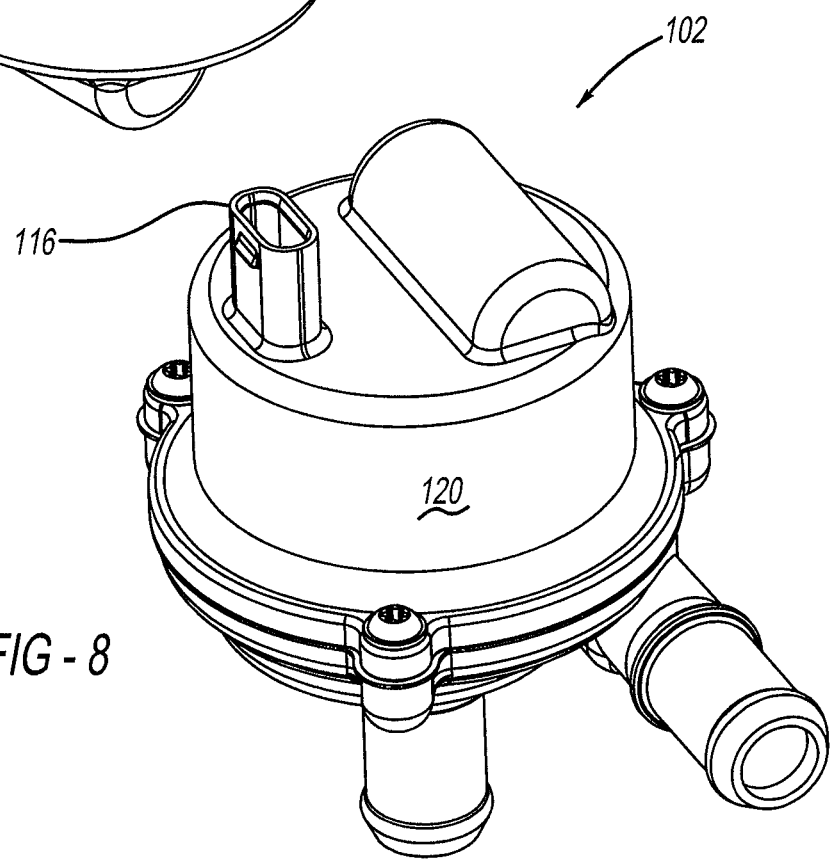
FIG. 8 is a perspective bottom view of an alternate embodiment of water pump arrangement in accordance with the present invention.

Referring to FIGS. 7-14 an alternate embodiment of a water pump arrangement 102 is shown. The water pump 102 has similar structures to the other embodiments shown in FIGS. 1-6, therefore, the similar structures have been labeled using reference numerals differing by 100. Referring now to FIGS. 7 and 8 a top and bottom perspective view of the water pump 102 is shown. The water pump 102 arrangement has been changed so that the electronics are located near the bottom of the water pump 102 (shown best in FIG. 11) therefore the power connection 116 is connected through the boot 120.

Figure 9:
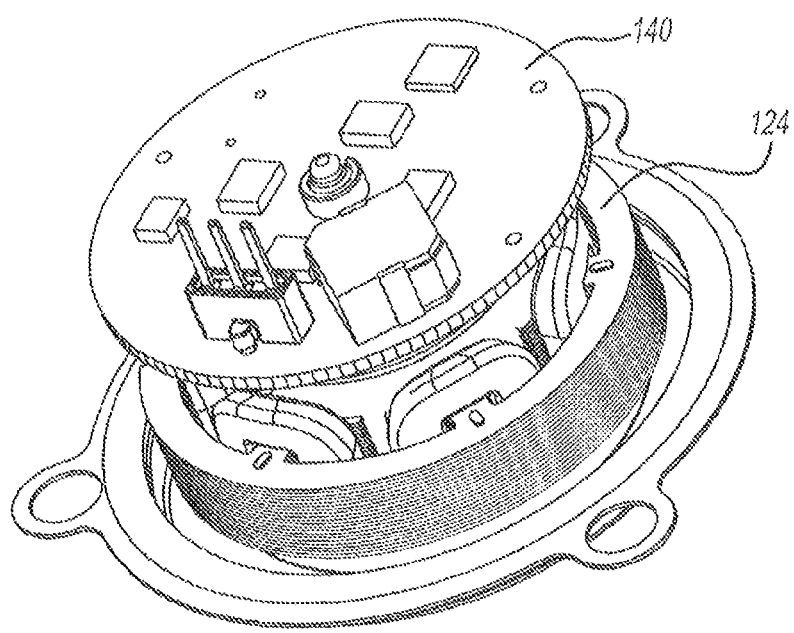
FIG. 9 is a perspective bottom view of the alternate embodiment of water pump arrangement with the boot removed.

FIG. 9 shows a perspective bottom view of the alternate embodiment with the boot 120 removed. An electronic donut 140 is located near the bottom of the boot (shown in FIG. 8) below a stator 124.

Figure 10:
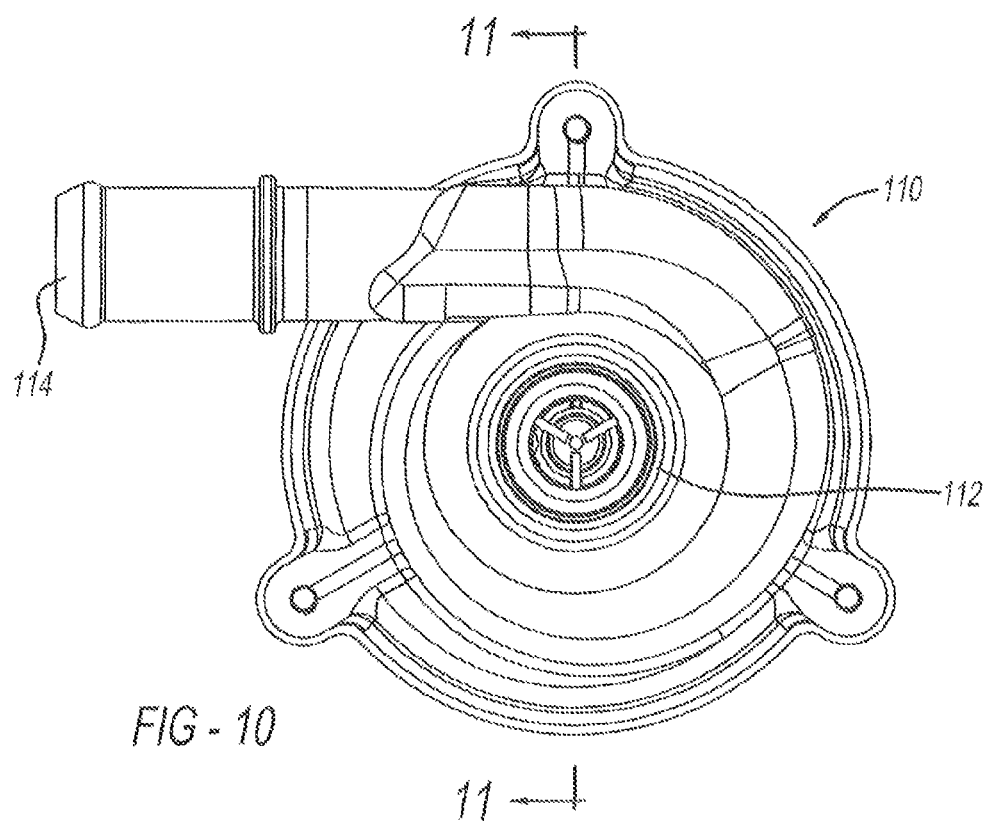
FIG. 10 is a top plan view of the cover of the alternate embodiment of water pump arrangement.

FIG. 10 shows a top plan view of a volute 110 in accordance with the alternate embodiment of the invention. The volute has an inlet 112 and outlet 114 and differs from the volute 10 shown in FIGS. 1-6 because the power connection 16 is not present.

Figure 11:
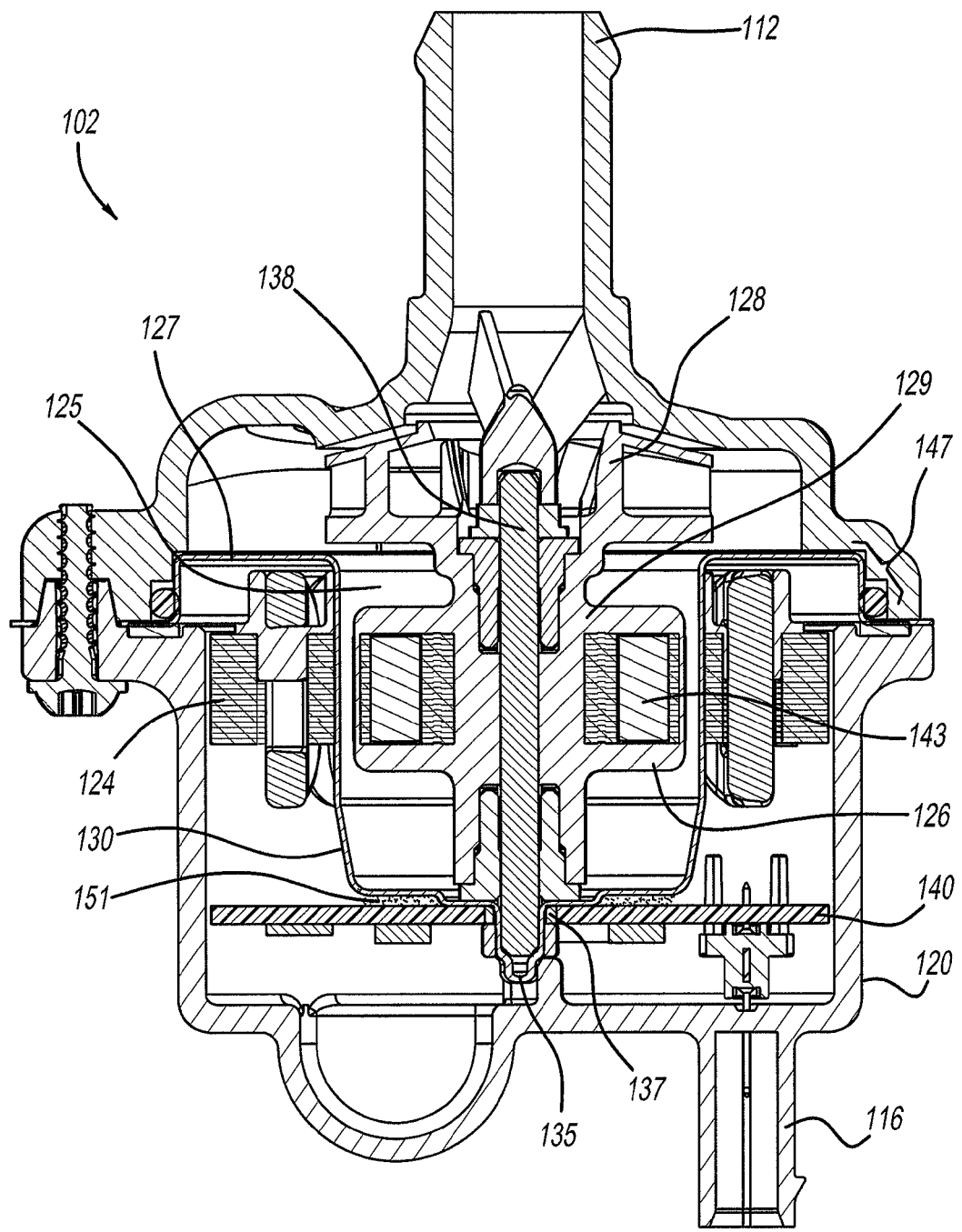
FIG. 11 is a cross-sectional side plan view of the alternate embodiment of the water pump arrangement.

FIG. 11 is a cross-sectional side plan view of the alternate embodiment of the water pump 102. In the present embodiment the electronic donut 140 is located at the bottom of the boot 120 and receives power from the power connector 116 formed on the boot 120. Positioning the electronic donut 140 at the bottom of the boot 120 allows for easier access to the electronic donut 140 without having to remove the rotor or stator. The electronic donut 140 further includes a copper ring 137 that provides an electrical ground for the electronics. While copper is used in the present embodiment, it is within the scope of this invention for other electrically conductive materials to be used.

A wetsleeve 130 is positioned above the electronic donut 140. The wetsleeve 130 has a chamber 125 where a shaft 138, rotor 126 and impeller 128 are contained and exposed to coolant fluid. The bottom of the wetsleeve has a seat or bulb 135 for receiving, positioning and holding an end of the shaft 138. The tip of the bulb 135 has an gas pocket between the bulb surface and the shaft 138 in order to relieve air during assembly or pressing of the end of the shaft 138 in to the bulb 135. The bulb 135 and shaft, when assembled together extend through the copper ring 137 of the electronic donut 140, where a press nut 141 is pressed onto the outside surface of the bulb 135 and secures the electronic donut 140 onto the bottom of the wetsleeve 130. The press nut 141 also holds the end of the shaft within the bulb 135 and prevents rotation of the shaft 138. The press nut 141 also contacts the copper ring 137 to facilitate the ground connection of the electronic donut 141; however, it is within the scope of the invention for other ground connections with the copper ring 137 to be made.

The wetsleeve 130 has a flange 127 that extends over the top of a stator 124 in order to fluidly seal the stator 124 and electronic donut 140 from exposure to fluid. When assembled a portion of the flange 127 provides a piston portion that contacts a seal to create a piston seal portion 147, that presses into the volute 110 and a portion of the flange 127 is crimped between the boot 120 and the volute 110 portions of the water pump 102. The piston seal portion 147 provides a fluid barrier between said volute 110 and said boot 120.

The stator 124 is circumferentially position on the outer surface of the wetsleeve 130 and is held in place using a slip fit, adhesives, fasteners, stakes, clips, threads or any other suitable retention mechanism. Since the wetsleeve 130 connects to both the stator 130 and the shaft 138 of the rotor 126 precise axial and radial alignment and reduced mechanical and magnetic air gaps are achieved.

Figure 12:
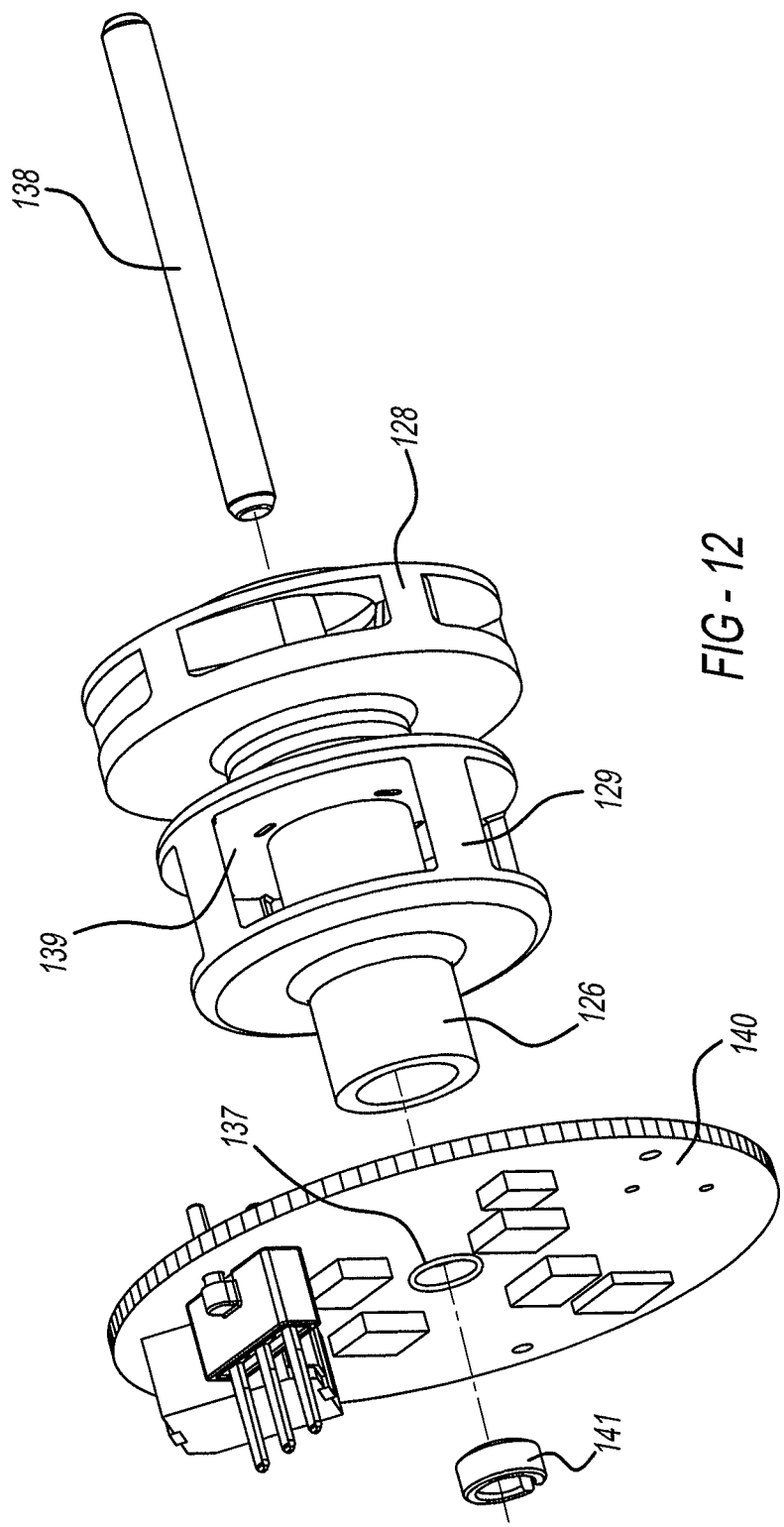
FIG. 12 is an exploded side perspective view of the electronic donut, rotor carrier, shaft and impeller in accordance with the alternate embodiment of the water pump arrangement.
Figure 13:
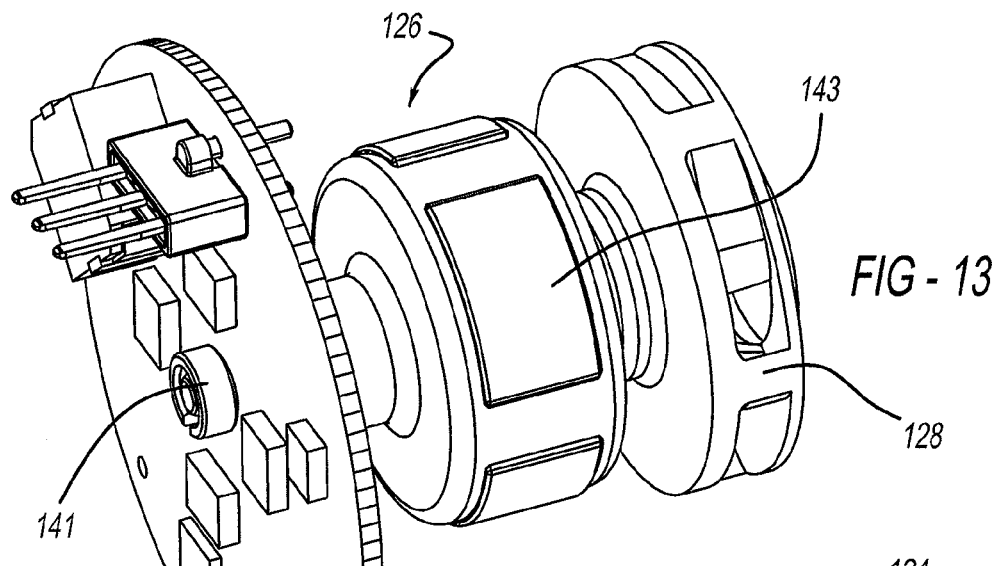
FIG. 13 is a side perspective view of the electronic donut, rotor carrier, shaft and impeller in accordance with the alternate embodiment of the water pump arrangement.
Figure 14:
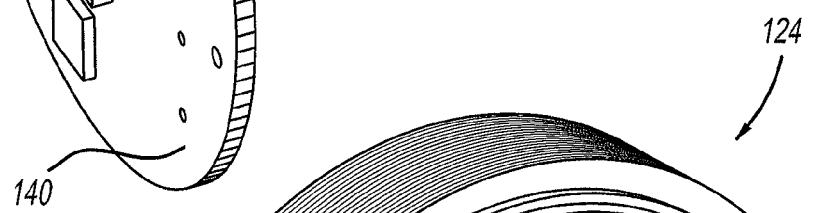
FIG. 14 is a side perspective view of the stator in accordance with the alternate embodiment of the water pump arrangement.

All embodiments of the invention allow for the use of ferrite magnets on the rotor. The use of ferrite more cost efficient and can possess better magnetic properties than magnets using rare earth metals, which would have to be embedded in the rotor to avoid exposure to coolant. Referring now to FIGS. 12 and 13 the configuration of the rotor 126 using ferrite arc magnets 143 is shown. In this particular embodiment the rotor 126 has a carrier 129 having apertures 139 for receiving and holding arc magnets 143. The carrier 126 can be over moulded onto the arc magnets 143. FIGS. 12 and 13 do not show the wetsleeve, but they do show the arrangement of the rotor 126, carrier 129, shaft 138, impeller 128 and electronic donut 140 with the push nut 141 that holds the components together. FIG. 14 shows the stator 124 with windings 145 that will slide onto the wet sleeve (shown in FIG. 11) and the other components shown in FIGS. 12 and 13.

In all of the embodiments described above heat derived from the electronics in the water pump 2, 102 is eliminated by using the wetsleeve 30, 130 and coolant flowing through the volute 10, 110. The conduction of heat from the electronics to the wetsleeve 30, 130 can be improved by using a thermal medium 151 (shown in FIG. 11), such as thermal grease, isotropic films or any other suitable thermal medium. However it is within the scope of this invention for a thermal medium to not be used depending on the needs of a particular application.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of resulting polymeric blend composition" also contemplates a teaching of ranges of same recited amount of "x" in percent by weight of the resulting polymeric blend composition.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. the terms "consisting essentially of" to describe a combination shall include the elements, ingredients, components or steps identified, and such other elements, ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An electric pump comprising:
   a rotor,
   a wetsleeve surrounding the rotor, wherein the wetsleeve includes: a cap that is a flanged portion of said wetsleeve; a sleeve that houses the rotor; and a seat in communication with a shaft of the rotor so that the seat assists in supporting the shaft;
   a stator assembled to the wetsleeve, wherein the rotor and stator have a magnetic air gap;
   an electronic donut that includes a printed circuit board and assists in controlling the electric pump, wherein the electronic donut is in direct contact with the wetsleeve so that the electronic donut is cooled by fluid moving through the wetsleeve;
   a boot portion that surrounds the electronic donut and stator; and
   a volute having an input and an output so that fluid is circulated through the pump, wherein the volute includes a power supply connection; wherein the wetsleeve includes a power adapter configured so that the power supply connection extends through the wetsleeve and is in communication with the electronic donut.

2. The electric pump of claim 1, wherein the rotor is a wet rotor and the stator is attached to the wetsleeve so heat from windings of said stator is dissipated to the fluid in contact with said stator.

3. The electric pump of claim 1, wherein the cap extends over the stator so that the fluid is prevented from directly contacting the stator.

4. The electric pump of claim 1, wherein the electronic donut is in communication with the cap of the wetsleeve so that the fluid assists in cooling the electronic donut and so that the fluid is prevented from contacting the electronic donut.

5. The electric pump of claim 4, further comprising a thermal medium positioned between said electronic donut and said wetsleeve.

6. The electric pump of claim 1, wherein the electric pump is free of an external structural housing.

7. The electric pump of claim 1, wherein the volute is connected to the boot portion so that the volute and boot portion form a cover and the flange portion of said wetsleeve has a piston seal portion for providing a fluid barrier between said volute and said boot portion.

8. The electric pump of claim 7, wherein the boot portion is a rubber boot portion that is attached to the volute via a fixation device so that the pump is sealed.

9. The electric pump of claim 8, wherein the rubber boot portion is an outermost cover of the pump.

10. The electric pump of claim 1, wherein the rotor includes an impeller.

11. The electric pump of claim 1, wherein the wetsleeve is a heat sink.

12. The electric pump of claim 1, wherein the volute is in communication with the shaft so that the volute assists in supporting, aligning and retaining the shaft.

13. An electric pump comprising:
    a rotor having a shaft;
    a wetsleeve surrounding the rotor, wherein the wetsleeve comprises:
        a cap;
        a sleeve that houses the rotor; and
        a seat in communication with the shaft of the rotor so that the seat assists in supporting the shaft;
    a stator surrounding the wetsleeve and the rotor;
    a volute covering an upper portion of the rotor, wetsleeve, and stator, wherein the volute includes a power supply connection;
    a rubber boot covering a lower portion of the rotor, wetsleeve, and stator, wherein the rubber boot connects to the volute forming a cover;
    wherein the rotor and stator have a magnetic air gap of about 1.5 mm or less; and
    an electronic donut that includes a printed circuit board and assists in controlling the electric pump, wherein the electronic donut is in direct contact with the wetsleeve so that the electronic donut is cooled by a fluid moving through the wetsleeve, and wherein the wetsleeve includes a power adapter configured so that the power supply connection extends through the wetsleeve and is in communication with the electronic donut.

14. The electric pump of claim 13, further comprising a flange portion of said wetsleeve having a piston seal portion for providing a fluid barrier between said volute and said rubber boot.

15. The electric pump of claim 13, further comprising a thermal medium positioned between said electronic donut and said wetsleeve.

* * * * *